United States Patent [19]

Nel

[11] Patent Number: 4,992,687
[45] Date of Patent: Feb. 12, 1991

[54] GENERATOR WITH INHERENT OVERLOAD LIMITING

[75] Inventor: Gert Nel, Roodepoort, South Africa

[73] Assignee: Techmarex (Properietary) Limited, Johannesburg, South Africa

[21] Appl. No.: 310,974

[22] Filed: Feb. 15, 1989

[30] Foreign Application Priority Data

Feb. 15, 1988 [ZA] South Africa .......... 88/1020

[51] Int. Cl.⁵ .......... H02P 9/34; H02K 9/06
[52] U.S. Cl. .......... 310/68 D; 219/133; 310/63
[58] Field of Search .......... 310/68 R, 68 D, 165, 310/64, 65, DIG. 6, 89; 219/133, 134; 322/62, 63, 59; 165/80.2

[56] References Cited

U.S. PATENT DOCUMENTS

| 3,034,035 | 5/1962 | Baumann et al. | 310/68 D |
| 3,250,929 | 5/1966 | Maier | 310/64 |
| 3,702,965 | 11/1972 | Drexler | 322/59 |
| 4,233,555 | 11/1980 | Roche | 322/63 |
| 4,477,767 | 10/1984 | Cotzas | 322/62 |
| 4,831,294 | 5/1989 | Jussila | 310/63 |

FOREIGN PATENT DOCUMENTS 870851 6/1961 United Kingdom .......... 310/68 D

Primary Examiner—Steven L. Stephan
Assistant Examiner—D. L. Rebsch
Attorney, Agent, or Firm—Darby & Darby

[57] ABSTRACT

A dynamo in the form of a 3 phase welding generator. One stator winding has an in-phase excitation winding feeding the rotor through slip rings. This configuration allows for inherent short-circuit protection as the stator core under short-circuit saturates and prevents rotor excitation, a shaft-mounted fan cools inner and outer surfaces of a tubular heat sink that surrounds the generator and holds a diode-resistor bank.

5 Claims, 2 Drawing Sheets

GENERATOR WITH INHERENT OVERLOAD LIMITING

INTRODUCTION

THIS INVENTION relates to a means of generating electrical power.

BACKGROUND TO THE INVENTION

In welding applications the electrical power required is often produced by a generator. In the conventional welding generator, the welding current is controlled by controlling the excitation current, which is direct current fed into the field windings. This current can be produced from an external source, such as a separate generator on the shaft of the welding motor generator set, or from the dynamo of a combustion engine driving the welding generator.

In order to control the generated welding current, the excitation current must be correspondingly controlled. This necessitates the use of a voltage regulator which controls the excitation current in accordance with the welding current required. Such regulators vary in sophistication, but invariably add to the cost of the apparatus.

A further problem with such welding generators is that when the output of the stator is short circuited, and if there is no specific current limiting, the regulator will attempt to drive the set at maximum current. The output current can rise to unsafe levels, causing damage to the alternator. To overcome this problem extra safety circuitry is required.

This invention will describe, in use, a welding generator. The scope of invention is however not limited to this application.

OBJECT OF THE INVENTION

It is the object of this invention to provide a simple robust welding generator with inherent output short circuit protection.

SUMMARY OF THE INVENTION

According to this invention a dynamo means comprises a wound stator and rotor with at least one excitation winding on the stator connected to supply field excitation current to the rotor winding and wound to be operatively in phase with a stator phase winding.

There is further provided for the excitation winding to supply approximately maximum excitation for rated current output capacity of the dynamo.

Further features of the invention provide for the dynamo means to be a three phase alternator having a rectified current output.

Further there is provided for there to be three excitation windings, each excitation phase being wound operatively in phase with one respective stator phase winding.

Still further, there is provided for the excitation current to be provided from one phase of the excitation windings, and for the field current to be fed through slip rings from the excitation winding to the field windings.

There is also provided for the power output of the welding generator to be controllable by means of a resistor bank in the form of a grid, having variable tapped outlets, and for the outlets to be in the form of heavy duty pin and socket connections. Preferably the excitation windings will have a separate power outlet for conventional peripheral devices such as motors, pumps, lights and the like.

A particular feature of the invention provides for the generator to have a heat sink in the form of two part circular metal sinks secured within the housing of the generator to form a generally tubular section spaced apart from the housing and the windings, and held in position by axially spaced bolts. There is provided for the rectified output from the stator to be provided from heavy duty diodes mounted on the heat sinks. Further, there is provided for a fan to be mounted on the shaft end for ventilation, and for the ventilation to be arranged to have flow passages on both sides of the tubular heat sink, and to be guided through passageways to pass through the resistor bank to provide cooling there as well, with the resistor bank mounted to extend axially along the outer periphery of the housing, with the base of the bank in communication with the housing interior for creation of the ventilation passageway.

The invention further extends to a method of providing a dynamo means with inherent output short circuit protection, comprising winding a wound stator and rotor, with at least one excitation winding on the stator connected to supply field excitation current to the rotor winding, and wound to be operatively in phase with a stator phase winding. The saturation of the stator core is utilized on occurrence of a short circuit to prevent voltage induction in the said excitation winding, and cause consequent cessation of field current in the rotor.

This method further, provides, where the dynamo means is a polyphase machine, having an excitation winding for each stator winding, and where one phase of the excitation windings is used to feed current through slip rings, to the field winding, for rotor excitation.

Still further this method provides for ventilating the dynamo housing with a fan mounted on the shaft end, and guiding ventilation air through flow passages on both inner and outer sides of a tubular heat sink within the housing, and through a voltage controlling resistor bank, to cool it.

BRIEF DESCRIPTION OF THE DRAWINGS

A preferred embodiment of the invention is described below by way of example only, and with reference to the accompanying drawings in which.

DETAILED DESCRIPTION OF THE DRAWINGS

Figure 1:
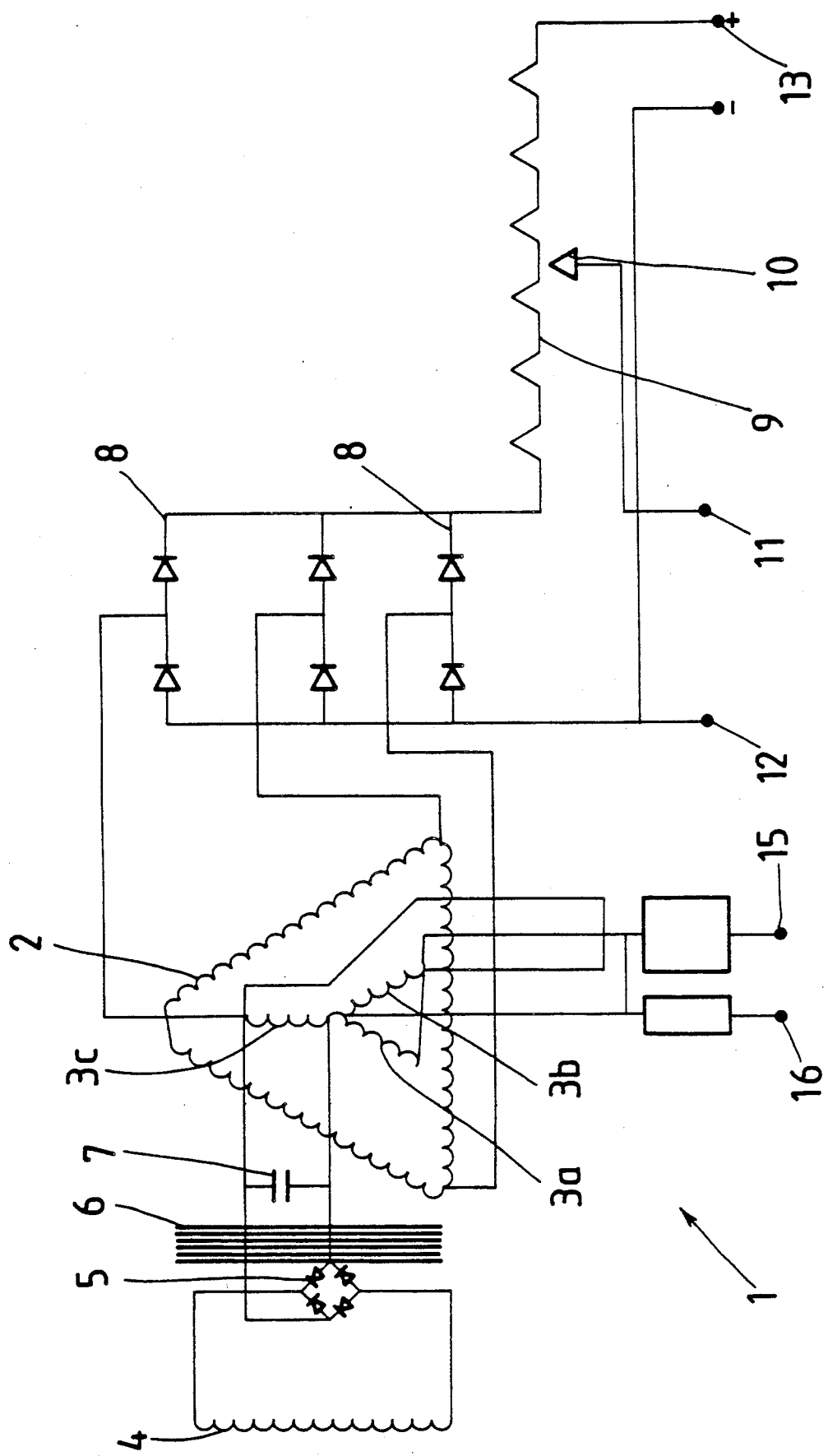
FIG. 1 is a circuit diagram of a welding generator.

Referring to FIG. 1, a circuit diagram of a welding generator is shown generally by numeral (1), having delta connected stator windings (2) with excitation windings (3a), (3b) and (3c) also wound on the stator. The rotor carries a field winding (4), which is connected for its excitation current through a full wave rectifier bridge (5) to excitation winding (3c), with the motor core depicted by numeral (6). A smoothing capacitance (7) is provided over the bridge for convenience.

The three phase output from the delta connected stator windings (2) provide the welding output and pass to a full wave rectifier bank (8) comprising a diode bridge, which feed through to a resistor bank (9) having a variable tap position (10) leading to an electrode outlet (11). The negative position of the rectifier (8) provides the ground connection (12). An ancillary battery outlet position (13) is provided having the negative line from ground and the positive line from one of the resistor bank taps.

The delta connected excitation windings (3a), (3b) and (3c) are wound so that each phase of the delta connection is wound exactly in the slots of and in phase with a particular phase of the delta winding (2) of the stator. In this embodiment excitation winding (3c) has tapped across it between the star connected neutral and its output end a take off which feeds the rectifier bridge (5) over the smoothing capacitor (7). The other windings of the excitation star connections are preferably also wound each in phase with one phase of the delta connected stator windings (2), but are in this embodiment not used to supply current to the field winding (4). The output from these two windings is connected to form a particular output (15), and the neutral of the star winding is taken out to form a further output (16). The output (15) forms, in this embodiment, a 380 volt supply relative to ground (12), and the output (16) a 220 volt supply relative to ground (12).

Figure 2:
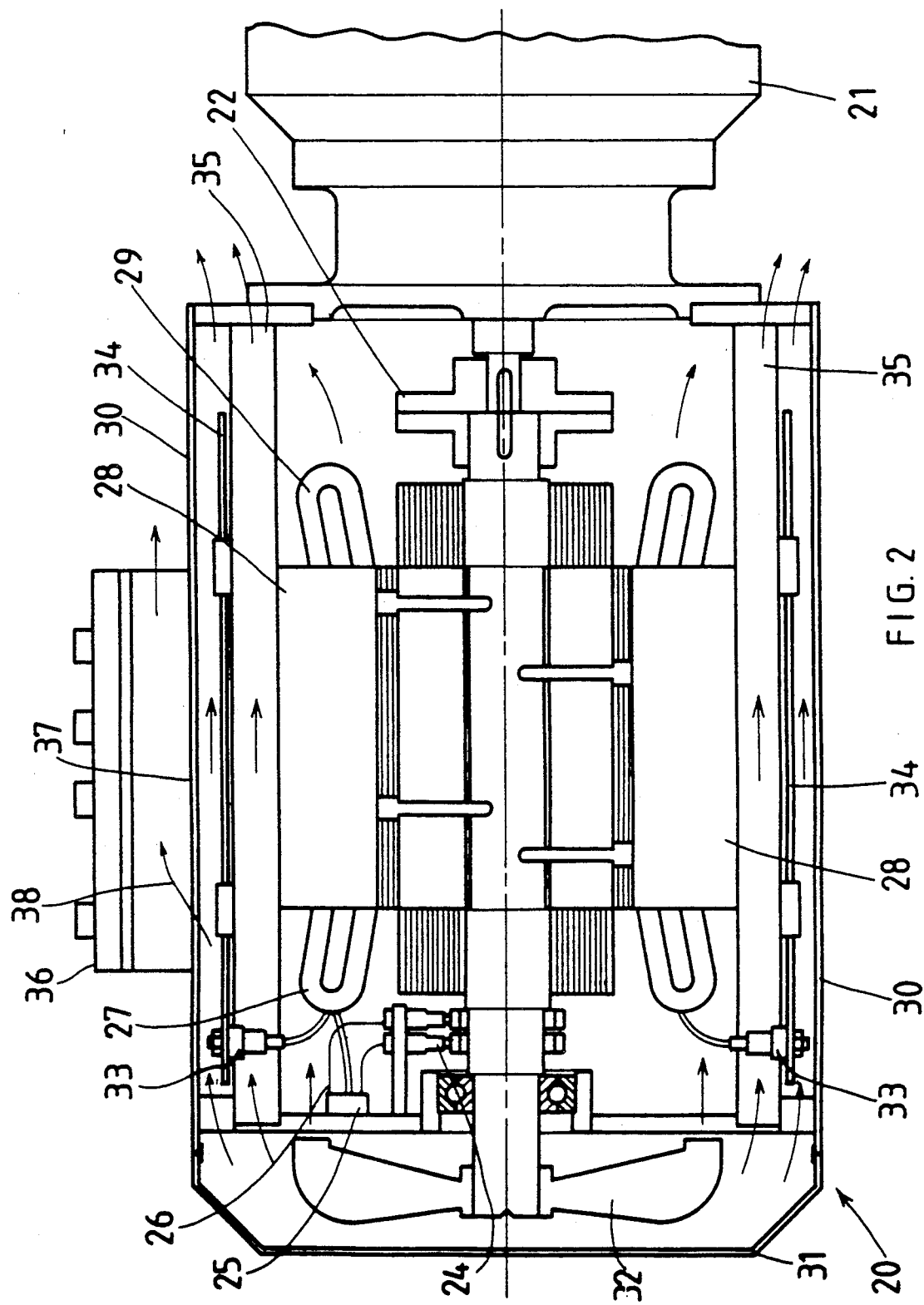
FIG. 2 is a cut away section of a welding generator.

Referring now to FIG. 2, the physical generator unit is shown in cross-sectional side elevation, with the generator unit (20) shown connected to be driven by the prime mover (21) through a coupling (22). The rotor (23) is located around the shaft and has slip rings (24) through which it receives its excitation current from a rectifier (25) which receives its input along connections (26) from one of the excitation windings on the stator indicated nominally by numeral (27). The stator (28) has its windings (29) thereon as described with reference to FIG. 1, wound in phase with the excitation stator windings (27). The generator has a tubular housing (30) with a fan end casing (31) covering a fan (32) mounted on the shaft end to drive air towards the prime mover end for cooling. The output of the stator windings, being the welding current, pass through a rectifier bank of diodes (33), which are mounted on two part circular heat sink elements (34). These elements are arranged around the inside of the housing, just spaced apart therefrom, and held by axial rods (35).

A resistor bank (36), referred to in the description of FIG. 1, is mounted to lie axially on top of the housing, and the housing is open (37) with the resistor bank (36) having an enclosure therearound to allow ventilation air (38) driven by the fan (32) to pass over the resistor strips (39) of the resistor bank and cool them.

In use, with the excitation winding (3c) wound to provide maximum excitation voltage, the field excitation in the rotor winding (4) is at all times at maximum for the production of maximum rated output from the stator windings (2). Thus no regulation is ever required in order to vary the excitation current to increase or lower the welding output current from the stator windings (2). This dispenses with the necessity for such a regulator, with very little additional cost. The variation in available current is achieved through a simple and robust resistor bank which will be reliable and easy to repair, particularly in the field. Additionally, the ancilliary power outputs (15) and (16) for peripheral devices can be utilized to good effect without diminishing the welding output or having to close down the welding operations before such devices can be used.

Owing to the fact that the excitation winding (3c), providing current for the field winding (4), is exactly in phase with one of the stator windings, should any of the outputs, including the auxilliary outputs (15) and (16), be short circuited, the core (6) will become saturated immediately, thus preventing excitation since the excitation winding (3c) will not be producing a potential difference. As soon as the saturation causes the excitation winding's voltage to drop below that required to drive the rectifiers (5), all excitation will cease and there will be no current output. Thus the system is provided with inherent short circuit protection, and the protection is of a kind that allows long term short circuiting without any stress or overload on the short circuit circuitry, since the position is stable and unstressed.

It has been found in practice that the generator works to good effect, and it is considered that a cheap and simple welding generator can be provided by this particular embodiment of the invention.

Variations may be made to the above embodiment without departing from the scope of the invention. Clearly the invention may be applied to the generation of current in a wide variety of circumstances, and is not restricted to the application in welding. Particularly, the excitation windings on the stator are not necessary to provide power for peripheral devices, and only one excitation winding need be provided to supply the excitation current. It is not necessary that the stator winding be in a delta connection, nor that the excitation windings be in a star connection.

What we claim as new and desire to secure by Letters Patent is:

1. A dynamo means, said dynamo means being a three-phase welding generator in a housing, said generator having a rectified current output, with at least one excitation winding on the stator connected to supply field excitation current to the rotor winding and wound to be operatively in phase with a stator phase winding, wherein the generator has a heat sin, in the form of two particular metal sinks, secured within the housing of the generator to form a generally tubular section spaced apart from the housing and the windings, and held in position by axially spaced bolts with the rectified output from the stator provided from heavy duty diodes mounted on the heat sinks, said generator further having a shaft and a fan mounted on the shaft end for ventilation, and ventilation flow passages on both the inner and outer sides of the tubular heat sink, there being ventilation passageways passing through the resistor bank to provide cooling, with the resistor bank mounted to extend axially along the outer periphery of the housing, and the base of the bank being in communication with the housing interior for creation of the ventilation passageways.

2. A dynamo means as claimed in claim 1 in which there is a fan mounted on the shaft end for ventilation, and there is arranged for ventilation flow passages on both the inner and outer sides of the tubular heat sink, there being ventilation passageways passing through the resistor bank to provide cooling, with the resistor bank mounted to extend axially along the outer periphery of the housing, and the base of the bank in communication with the housing interior for creation of the ventilation passageway.

3. A method of providing a dynamo means with inherent output short circuit protection comprising winding a wound stator and rotor with at least one excitation winding on the stator connected to supply field excitation current to the rotor winding and wound to be operatively in phase with a stator phase winding, and utilizing stator core saturation on occurrence of a short circuit to prevent voltage induction in said excitation winding, and cause consequent cessation of field current in the rotor, and ventilating the dynamo housing with a fan mounted on the shaft end and guiding ventilation air through flow passages on both inner and outer sides of a tubular heat sink within the housing, and through a voltage controlling resistor bank to cool it.

4. A method as claimed in claim 3 in which the dynamo means is a polyphase machine having an excitation winding for each stator winding and one phase of the excitation windings is used to feed current through slip rings, to the field winding for providing rotor excitation.

5. A method as claimed in claim 3 including ventilating the dynamo housing with a fan mounted on the shaft end and guiding ventilation air through flow passages on both inner and outer sides of a tubular heat sink within the housing, and through a voltage controlling resistor bank to cool it.

* * * * *